(12) United States Patent
Kuhn et al.

(10) Patent No.: US 10,292,514 B1
(45) Date of Patent: May 21, 2019

(54) ROTATING AND SELF ALIGNING MAGNETIC RETENTION SYSTEM

(71) Applicants: Todd Kuhn, Gulfport, MS (US); Jason P. Campbell, Slidell, LA (US)

(72) Inventors: Todd Kuhn, Gulfport, MS (US); Jason P. Campbell, Slidell, LA (US)

(*) Notice: Subject to any disclaimer, the term of this patent is extended or adjusted under 35 U.S.C. 154(b) by 22 days.

(21) Appl. No.: 15/586,965

(22) Filed: May 4, 2017

Related U.S. Application Data

(60) Provisional application No. 62/395,542, filed on Sep. 16, 2016.

(51) Int. Cl.

| | |
|---|---|
| *H01F 7/20* | (2006.01) |
| *A47G 23/02* | (2006.01) |
| *F16B 1/00* | (2006.01) |
| *F16M 13/02* | (2006.01) |
| *B60N 3/10* | (2006.01) |
| *A47C 7/68* | (2006.01) |
| *B65D 25/20* | (2006.01) |
| *B63B 17/00* | (2006.01) |
| *B60R 11/00* | (2006.01) |

(52) U.S. Cl.
CPC ............ *A47G 23/0225* (2013.01); *A47C 7/68* (2013.01); *B60N 3/101* (2013.01); *B63B 17/00* (2013.01); *B65D 25/20* (2013.01); *F16B 1/00* (2013.01); *F16M 13/02* (2013.01); *B60R 2011/0057* (2013.01); *F16B 2001/0035* (2013.01)

(58) Field of Classification Search
CPC . H05K 7/16; G06F 1/16; H02K 11/00; H03M 1/22; G09G 5/00; G01B 7/14

USPC ........................................................ 335/285
See application file for complete search history.

(56) References Cited

U.S. PATENT DOCUMENTS

| 2,420,607 A | * | 5/1947 | Mendelsohn | ......... G06M 1/163 235/110 |
| 3,177,546 A | * | 4/1965 | Bey | ...................... A44B 15/002 24/303 |
| 3,474,366 A | | 10/1969 | Barney | |

(Continued)

*Primary Examiner* — Shawki S Ismail
*Assistant Examiner* — Lisa N Homza
(74) *Attorney, Agent, or Firm* — Brian S. Steinberger; Law Offices of Brian S. Steinberger, P.A.

(57) ABSTRACT

The present invention relates to guideless, magnetic holders for beverage vessels and the like, and in particular, to devices, systems, sets and methods for providing paired, magnets for application onto, or manufacture thereinto, structures such as automobiles, boats, all-terrain vehicles (ATV's), snowmobiles, recreational vehicles (RV's), personal watercraft, golf carts, kayaks, appliances, tools, lawn tractors, farm equipment, motorcycles, furniture, coolers, stadium seating, and the like, or surface mounted, retrofit kits. A vessel component can be a metal plate with material having increasing width or increasing thickness. A hub support component can have at least one moveable magnet in a chamber, the moveable magnet being initially repulsed by a fixed magnet to a bottom of the chamber. Positioning and rotating the component over the hub increases the magnetic attraction so that the at least one moveable magnet moves upward to a top of the chamber causing a click noise signifying a strong magnetic lock position between the vessel component and the hub. The holder can be used with at least one channel having a moveable magnet therein, where the holder can be attachable to a metal surface.

16 Claims, 9 Drawing Sheets

(56) References Cited

U.S. PATENT DOCUMENTS

| | | | | |
|---|---|---|---|---|
| 4,161,832 A | * | 7/1979 | Bergamini | G09F 9/30 40/451 |
| 4,231,137 A | * | 11/1980 | Fujimoto | A44C 5/2071 24/303 |
| 4,318,098 A | * | 3/1982 | McGreevy | G09F 9/375 340/815.62 |
| 4,523,083 A | | 6/1985 | Hamilton | |
| 4,794,391 A | * | 12/1988 | Costa | G09F 9/305 340/815.43 |
| 5,008,984 A | * | 4/1991 | Levy | A44C 5/2042 24/303 |
| 5,092,019 A | * | 3/1992 | Levy | A44C 5/208 24/303 |
| 5,367,891 A | * | 11/1994 | Furuyama | A44C 5/2057 24/303 |
| 6,065,632 A | | 5/2000 | Moore, Jr. | |
| 6,193,202 B1 | | 2/2001 | Rogers | |
| 6,292,985 B1 | * | 9/2001 | Grunberger | A44B 11/2592 24/303 |
| 6,505,385 B2 | * | 1/2003 | Grunberger | A44B 11/2592 24/303 |
| 6,695,272 B1 | | 2/2004 | Bomgaars et al. | |
| 6,892,428 B2 | | 5/2005 | Reiter | |
| 7,066,778 B2 | | 6/2006 | Kretzschmar | |
| 8,251,247 B1 | | 8/2012 | Breckner | |
| 8,264,310 B2 | * | 9/2012 | Lauder | G06F 1/1613 335/219 |
| 8,390,275 B2 | * | 3/2013 | Inoue | H01H 25/04 324/207.25 |
| 8,941,455 B2 | | 1/2015 | Alexander et al. | |
| 8,964,379 B2 | * | 2/2015 | Rihn | G06F 1/1616 361/679.56 |
| 9,157,573 B1 | | 10/2015 | Zach | |
| 9,397,719 B1 | | 7/2016 | Schmidt | |
| 9,568,272 B2 | | 2/2017 | Grace, Jr. | |
| 9,578,954 B2 | | 2/2017 | Sellars | |
| 2003/0061689 A1 | * | 4/2003 | Fuhrman | A44C 5/2076 24/303 |
| 2004/0244419 A1 | * | 12/2004 | Suzuki | A44C 5/2076 63/3.1 |
| 2005/0056655 A1 | | 3/2005 | Gary | |
| 2007/0114351 A1 | | 5/2007 | Mitchell | |
| 2007/0182718 A1 | * | 8/2007 | Schoener | B60K 35/00 345/173 |
| 2007/0188453 A1 | * | 8/2007 | O'Sullivan | G06F 3/0312 345/163 |
| 2007/0222343 A1 | * | 9/2007 | Kang | G06F 3/016 310/68 R |
| 2011/0018665 A1 | | 1/2011 | Fullerton et al. | |
| 2011/0179864 A1 | * | 7/2011 | Raasch | G06F 1/1616 73/493 |
| 2012/0094257 A1 | * | 4/2012 | Pillischer | B41J 3/32 434/113 |
| 2012/0099749 A1 | * | 4/2012 | Rubin | H04M 1/0237 381/332 |
| 2012/0117409 A1 | * | 5/2012 | Lee | G06F 1/26 713/340 |
| 2012/0140396 A1 | * | 6/2012 | Zeliff | G06F 1/1628 361/679.09 |
| 2012/0146752 A1 | | 6/2012 | Fullerton et al. | |
| 2012/0182242 A1 | * | 7/2012 | Lindahl | B60R 1/12 345/173 |
| 2012/0194448 A1 | * | 8/2012 | Rothkopf | A45C 13/002 345/173 |
| 2012/0256959 A1 | * | 10/2012 | Ye | G06F 3/0488 345/649 |
| 2012/0286912 A1 | | 11/2012 | Fullerton et al. | |
| 2012/0300275 A1 | * | 11/2012 | Vilardell | G06F 1/1626 359/32 |
| 2013/0009413 A1 | * | 1/2013 | Chiu, Jr. | A45F 5/021 294/142 |
| 2013/0063873 A1 | * | 3/2013 | Wodrich | G06F 1/1635 361/679.01 |
| 2013/0083466 A1 | * | 4/2013 | Becze | G06F 3/1438 361/679.27 |
| 2013/0329360 A1 | * | 12/2013 | Aldana | G06F 1/1626 361/679.56 |
| 2014/0355200 A1 | | 12/2014 | Thiers | |

* cited by examiner

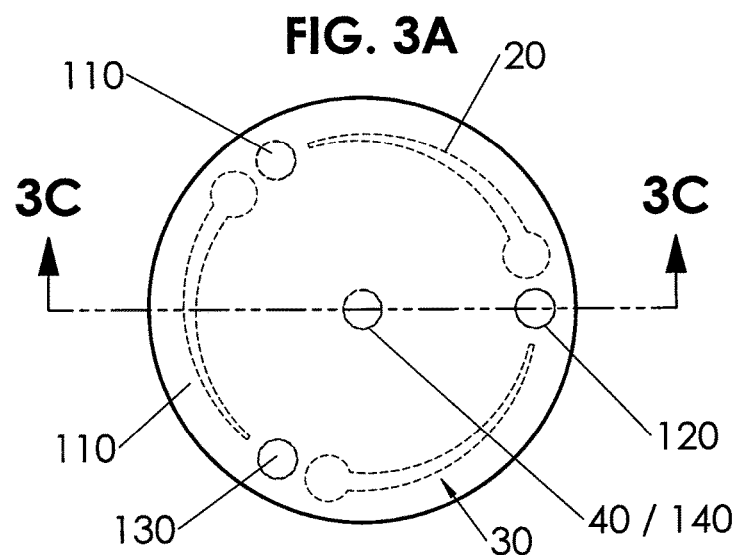
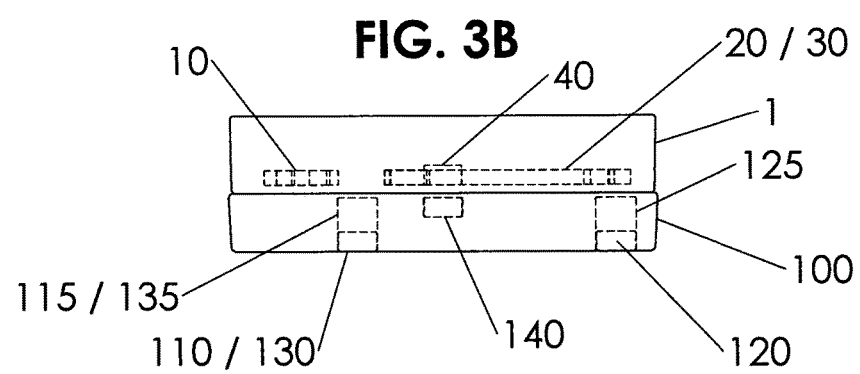
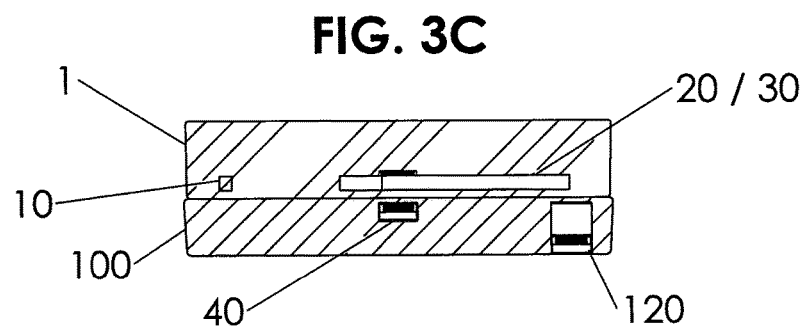

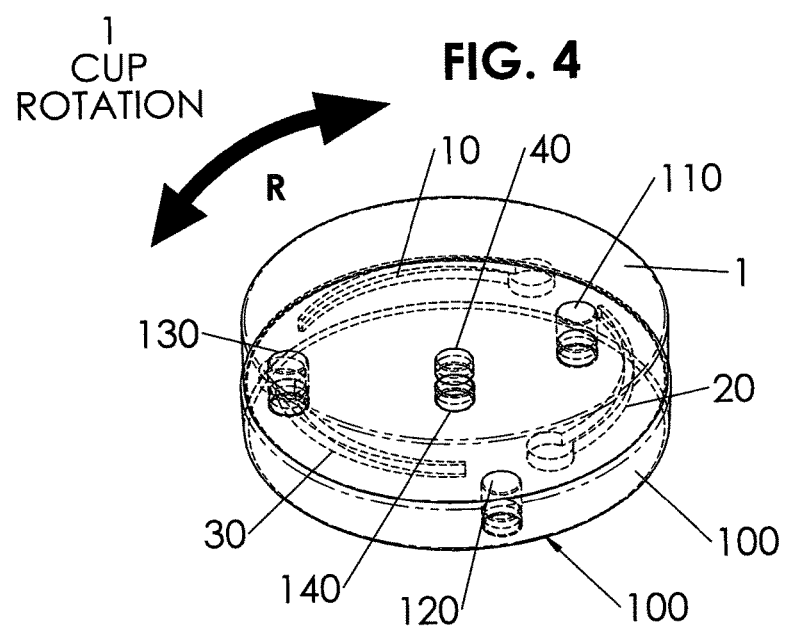

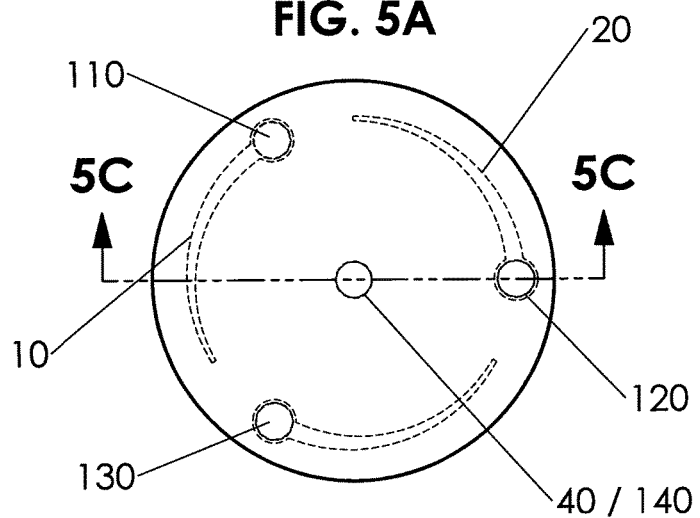
FIG. 5A
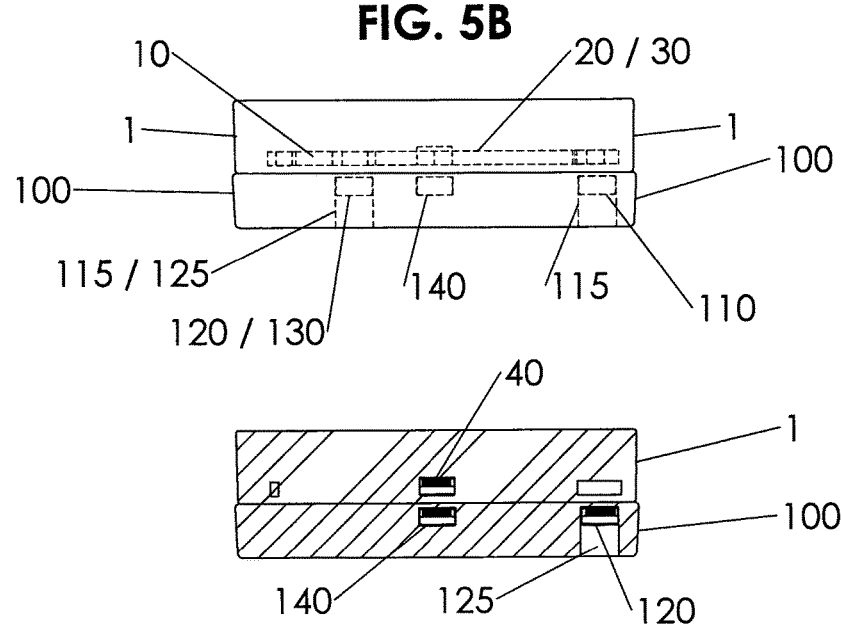
FIG. 5B
FIG. 5C

ROTATING AND SELF ALIGNING MAGNETIC RETENTION SYSTEM

CROSS REFERENCE TO RELATED APPLICATIONS

This application claims the benefit of priority to U.S. Provisional Application Ser. No. 62/395,542 filed Sep. 16, 2016, the entire disclosure of which is incorporated by reference in its' entirety.

FIELD OF INVENTION

The present invention relates to guideless, trackless, magnetic holders for beverage vessels and the like, and in particular, to devices, systems, sets and methods for providing magnets for application onto, or manufacture thereinto, structures such as automobiles, boats, (all-terrain vehicles (ATV's), snowmobiles, recreational vehicles (RV's), personal watercraft, lawn tractors, farm equipment, motorcycles, golf carts, kayaks, furniture, coolers, ice chests, stadium seating, and the like, or surface mounted, retrofit kits, which includes a cup/vessel support component for a beverage, the component having a metal plate with material having increasing width and/or increasing thickness, along with a hub support component having at least one moveable magnet in a chamber, the moveable magnet being initially repulsed by a fixed magnet to a bottom of the chamber, and wherein positioning and rotating the component over the hub increases the magnetic attraction so that the at least one moveable magnet moves upward to a top of the chamber causing a click noise signifying a strong magnetic lock position between the component and the hub.

BACKGROUND AND PRIOR ART

It is very popular for vehicles (including but not limited to, cars, trucks, boats, planes, RV's, ATV's, personal watercraft, lawnmowers, furniture, kayaks, golf carts etc.) to have one size cup holders primarily built into consoles. While, the one size built-in cup holders are large enough to handle large cups such as 32 ounces, 48 ounces, 64 ounce cups and the like, the one-size cup holders end up loosely holding smaller beverage containers such as small cups, 12 ounces and 16 ounce cans and bottles. As a result, these smaller beverage containers can often spill and fall out when a vehicle is traveling over bumps, making turns and/or making sudden stops. These built-in beverage holders require large voids be incorporated into structural features of the vehicles to accommodate the beverage profile and keep it held in place via mechanical means. These large voids often require an enormous amount of wasted space both above and below the beverage holding structure. This "dead" space would be better served for use for other critical components (i.e., electronic controllers, storage space, etc.).

Attempts have been made over the years to use beverage holders such as insulation sleeves for bottles and cans, straps for bottles and cans and mugs, where the beverage holders incorporate traditional fixed magnets, that allow the beverage holder to be attachable to a fixed support that can have another mateable magnet, and the like. See for example, U.S. Pat. No. 6,065,632 to Moore, Jr.; U.S. Pat. No. 6,193,202 to Rogers; U.S. Pat. No. 8,251,247 to Breckner; U.S. Pat. No. 9,157,573 to Zach et al.; and U.S. Pat. No. 9,578,954 to Sellars.

However, the mere use of traditional magnets is flawed for all but the simplest of uses (i.e. refrigerator magnets, laptop chargers, purse closures and the like.). If the magnets are strong they accelerate the object attaching to the other object creating a jolt and are difficult to detach. If the magnets are weak their retention ability is limited. Proximity between a magnet and a magnetic surface causes problems. The distance separating magnets and their attachment greatly increases and/or decreases a magnets ability to attract. While touching magnets are very strong—with any distance between them they become exponentially weaker.

Attempts have been made to use additional fasteners, such as coded type magnets (i.e., "programmable magnets") to attach objects inside vehicles. See for example, U.S. Published Patent Application 2011/0018665 to Fullerton et al. and U.S. Pat. No. 8,941,455 to Alexander et al. which are incorporated by reference in their entirety.

Fullerton et al. (U.S. Patent Application 2011/0018665) provides a coded magnet attachment utilizing magnetic field emission structures includes a surface, for example a horizontal surface on a table, ledge, or the like. Fullerton teaches of an "alignment force" which matches polarities and "draws" the vessel to the structure. The Fullerton embodiment, with its "all-or-none" attraction resulting in a jarring effect when the two bodies align and are magnetically attracted to each other. This feature can result in spilled beverages as the vessel and structure come into violent contact with each other. This is an undesirable feature when hot beverages are housed in the beverage vessel, which can lead to personal injury to the user. Additionally, the Fullerton et al. design is hampered when the user places the vessel in near-field alignment with the like polarities, causing a rapid rotation of the vessel (as the attracted polarities come into approximation of each other), twisting from the user's hand and most likely resulting in dangerous spillage.

The present invention, in contrast, does not rely on an alignment feature, and subsequently does not demonstrate this tendency to rotate independent if the user, nor have a "jarring" effect as it does not "lock" as taught by Fullerton et al. art.

The present invention provides a very-low engagement magnetic attraction force quotient, which minimizes the attractive forces when the two system components are placed within their respective magnetic attractive range. This feature precludes unwanted acceleration of the components, and eliminates the "jarring" effect found in the Fullerton et al. prior art.

Furthermore, this present invention teaches a "progressive, rheostat-like, incrementally increasing and/or decreasing the magnetic attraction force along a defined but not limited to circumferential, rotational path" which neither jars, nor unexpectedly rotates the vessel. Additionally, the present invention rotates smoothly along an up to 360-degree, generally concentric axis, which keeps the vessel centered.

As anyone versed in the art will realize, these features are not contemplated by the Fullerton et al. application nor in prior art. Summarily, Fullerton et al. does not contemplate the use of retrofit kits as a means of securing any loose, vessel-like objects to any and all geometrically configured surface.

Alexander et al. (U.S. Pat. No. 8,941,455) teaches of an interior vehicle attachment system adapted to selectively secure an object relative to a surface, such that the object achieves a retained condition, the system comprising an interior vehicular component accessible to an occupant, defining the surface, and including a fixed coded magnet having a fixed plurality of maxels having individual polarities and strengths, and cooperatively emitting a magnetic field profile from the surface; and "a guide configured and positioned to physically engage the object, so as to reduce or eliminate motion by the object in at least one direction."

The Alexander et al. patent does not contemplate the present inventions, "guideless system" of magnets, with its progressive, rheostat-like, incrementally increasing and/or decreasing the magnetic attraction force along a defined circumferential, rotational path. Additionally, Alexander et al. does not teach of the use of retrofit kits as a means of securing any loose, vessel-like objects to any geometrically configured surface.

Thus, the need exists for solutions to the above problems with the prior art.

SUMMARY OF THE INVENTION

A primary objective of the present invention, is to provide a beverage vessel, and the like, retentions system which provides a mounting surface which is free from indentions, holes, and cavities, thus providing additional, alternative usable space when the beverage vessel or the like is not in use.

A secondary objective of the present invention is to provide a guideless, magnetic holders for beverage vessels and the like, and in particular, to devices, systems, sets and methods for providing paired magnets for application onto, or manufacture thereinto, structures such as automobiles, boats, ATV's, snowmobiles, RV's, personal watercraft, lawn tractors, farm equipment, motorcycles, furniture, coolers, golf carts, kayaks, stadium seating, and the like, or surface mounted, retrofit kits.

A third objective of the present invention is to provide devices, systems sets and methods for using magnets in retrofit kits to allow for beverage holders with upper magnets to twist lock onto bases having magnets to provide an increasing attractive force while twisting the beverage holder over the base, where the bases can be pre-attached onto interior surfaces of motor vehicles, interior and exterior surfaces of boats, on furniture and the like. The retrofit kits can be used to hold beverages securely and safely inside of vehicles, on boats, and on other surfaces such as but not limited to furniture, such as on tables, and the like.

A fourth objective of the present invention is to provide a dumb (non-programmable) magnetic holder for beverage vessels and the like, retention system which is spill-proof compared to previous designs, when the vessel's magnetic system is introduced into the magnetic engagement area of the base by limiting the engagement force of said system.

A fifth objective of the present invention is to provide a progressive, incrementally increasing magnetic force as the vessel is rotated to increase attractiveness and eliminate potential spillage from inadvertently knocking the vessel over.

A sixth objective of the present invention is to provide devices, systems, sets and methods of using guideless, trackless, magnetic holders for beverage vessels that automatically engages a proximity change allowing the use of a magnet that would otherwise be far too strong to easily attach and detach an object as needed.

A seventh objective of the present invention is to provide devices, systems, sets and methods of using guideless, trackless, magnetic holders for beverage vessels which allows for automatic engagement (movement) of magnets which resolves all of the flaws inherent with traditional magnetic attachment.

An eighth objective of the present invention is to provide devices, systems, sets and methods of using guideless, trackless, magnetic holders for beverage vessels which no longer needs to compromise between attachment strength and burden of removal, so that the user is able to use the strong and easy to remove, essentially on and off magnetism.

A ninth objective of the present invention is to provide devices, systems, sets and methods of using guideless, trackless, magnetic holders for beverage vessels which greatly reduces acceleration/jolt of attachment and detachment A tenth objective of the present invention is to provide devices, systems, sets and methods of using guideless, trackless, magnetic holders for beverage vessels which creates audible and tactile "click" when the beverage holder is engaged in a locked magnetic attraction position.

An eleventh objective of the present invention is to provide devices, systems, sets and methods of using guideless, trackless, magnetic holders for beverage vessels which requires no power source to increase and decrease attachment.

A twelfth objective of the present invention is to provide devices, systems, sets and methods of using guideless, trackless, magnetic holders for beverage vessels which requires zero moving parts (aside from magnets).

A thirteenth objective of the present invention is to provide devices, systems, sets and methods of using guideless, trackless, magnetic holders for beverage vessels which includes infinitely variable attachment strengths depending on magnet count, size, composition and configuration.

An embodiment can include an upper portion such as an upper compartment/cup and a separate mounted hub/base. The upper compartment/cup can include a plurality of equally spaced (or unequally spaced) apart perimeter located curved metal shapes fixed in a housing. Each curved shape can have narrow tip ends, which widen to enlarged head heads, along with or without a central fixed alignment magnet in the middle. The curved metal plates can be squid shaped and also refers to an object or geometric figure intended to increase magnetism via increasing or varying the mass within magnetic range.

The lower hub/base can be mounted into a support surface so as to be flush to the support surface, or be attached to the top of a support surface, such as but not limited to be a surface, such as a top of a console in a vehicle. The hub/base, can function as an attachment platform, and have a plurality of vertically moveable magnets along the perimeter, equal in number to the curved metal plates and a centrally located alignment magnet.

Hubs and base configurations can be swapped per application needs with the hub being housed in the beverage vessel or on top, inside or beneath the desired attachment surface.

The optional centrally located alignment magnet in the base/hub can be positioned just below the top surface of the hub/base and the plurality of moveable magnets can each be contained in cylinder channels that each have an inside cavity height greater than the thickness (width) of the moveable magnets.

Polarity gradients between hub/base central aligned magnet and each of the vertically moveable magnets, causes the moveable magnets to remain in the "disengaged" position which is a lower position based on based on magnetic repulsion. The disengaged position is the position furthest from the top surface (dependent on vessel orientation) of the hub/base opposite of the central magnet in the upper compartment/cup.

As an upper object (such as a beverage container) containing a metal plate that has a tapered configuration or a material having varying degrees of mass, such as a material having varying widening or thickening portions, which can include but is not limited to a curved plate shape, and the like. The metal plate can be placed in the upper object, above, a lower positioned hub/base having vertically moveable hub/base magnets.

Optionally, an additional aligned upper central located magnet can also be used with a lower central aligned magnet(s) so as to align and attract with one another.

In one embodiment, as the upper object is rotated, such as counter-clockwise, the increasing wider or thicker metal (i.e., attractant surface) surface of each of the curved plates becomes an increasingly attractive mass that begins to align with the vertical channels housing the moveable magnets in the base/hub. When the attraction to this increasing ferromagnetic mass exceeds the upper centrally alignment (this magnet serves as the repulsion magnet) magnet to the lower moveable magnets in the base/hub, the lower moveable magnet or magnets in the hub/base shift from the disengaged to the engaged position.

The engaged position is the position nearest the hubs surface (which is the closed top of each of the vertical channels). Moveable ("engagement magnets") magnets are now at the hubs surface. Because the moveable magnets have shifted into the engaged position and are thus closer to the attractive mass their retention power is instantly exponentially increased relative to their disengaged resting position. This movement from disengaged to engaged creates an audible and tactile "click"

As the user rotates the upper object containing the curved metal plates the mass aligned over the channels containing the moveable magnets decreases. At the point in which the upper centrally aligned magnet repulsion exceeds the attraction of the moveable magnets attraction to the enlarged head of the curved metal plate mass the upper component (object) returns to the disengaged position creating an audible and tactile click.

This reactive magnetic attachment allows a device to create exponential attraction without any power source. Rotating a device a few degrees, resulting in the moveable magnets engagement can result in magnet force, depending on configuration, increasing from less than approximately 1 lb. to over approximately 30 lbs of retention in just a few degrees of rotation and then back to near zero. The device can contain any number of different shapes of curved plates, and "squid" (will the examiner understand "squid heads?" should we explain they are varying geometries of attractive metal surfaces?) heads (geometrically varying attractive surfaces), magnets and combinations of length or diameter for many applications.

The device and its hubs and squids can be configured such either component is on, in, above or below the beverage vessel or on any attachment locations such as but not limited to as automobiles, boats, (all-terrain vehicles (ATV's), snowmobiles, recreational vehicles (RV's), personal watercraft, lawn tractors, farm equipment, motorcycles, golf carts, kayaks, furniture, coolers, ice chests, stadium seating, and the like.

Another embodiment of a magnetic holder for holding an object therein, can include a hub having a vertical channel therein with a top and a bottom, a moveable magnet inside of the channel being moveable between the top and the bottom of the channel, and a component for causing the moveable magnet to initially rest against the top of the channel, wherein placing the hub on a surface having metal causes an attraction force overcoming the initial rest position of the moveable magnet to move from the top of the channel to the bottom of the channel which attaches the hub to the surface having the metal.

The component can include a fixed metal portion in the top of the channel to initially cause the moveable magnet to rest against the top of the channel.

The component can include a fixed magnet in the hub having a polarity causing the moveable magnet to initially rest against the top of the channel.

The magnetic holder can further include a second vertical channel in the hub with a top and a bottom, the second vertical channel being parallel to the first vertical channel, and a second moveable magnet inside of the second channel being moveable between the top and the bottom of the second channel.

The component can include a fixed metal portion in the top of both the first and the second channels to initially cause the first and the second moveable magnets to rest against the top of the first and the second channels.

The component can include a fixed magnet in the hub having a polarity causing the first and the second moveable magnets to initially rest against the top of the first and the second channels.

The hub can be a beverage holder.

Further objects and advantages of this invention will be apparent from the following detailed description of the presently preferred embodiments which are illustrated schematically in the accompanying drawings.

BRIEF DESCRIPTION OF THE FIGURES

FIG. 3A is a top partial ghost view of the cup/compartment of FIGS. 1A-1B placed on top of the base/hub of FIGS. 2A-2B with the perimeter magnets in the base/hub disengaged from the curved metal plates in the upper cup/compartment.

FIG. 3B is a side view of FIG. 3A along arrow 1B.

FIG. 3C is a cross-sectional view of the cup/compartment on top of the base/hub of FIG. 3A along arrows 3C.

FIG. 4 is a perspective view of the cup/compartment placed on the top of the base/hub of FIGS. 3A-3C in a disengaged position with the cup/compartment about to be rotated.

FIG. 5A is a top partial ghost view of the cup/compartment placed on top of the base/hub of FIGS. 3A-3C, 4 with the cup/compartment rotated to an engaged position.

FIG. 5B is a side view of the cup/compartment of FIG. 5A along arrow 5B.

FIG. 5C is a cross-sectional view of the cup/compartment of FIG. 5A along arrows 5C.

DESCRIPTION OF THE PREFERRED EMBODIMENTS

Figure 1A:
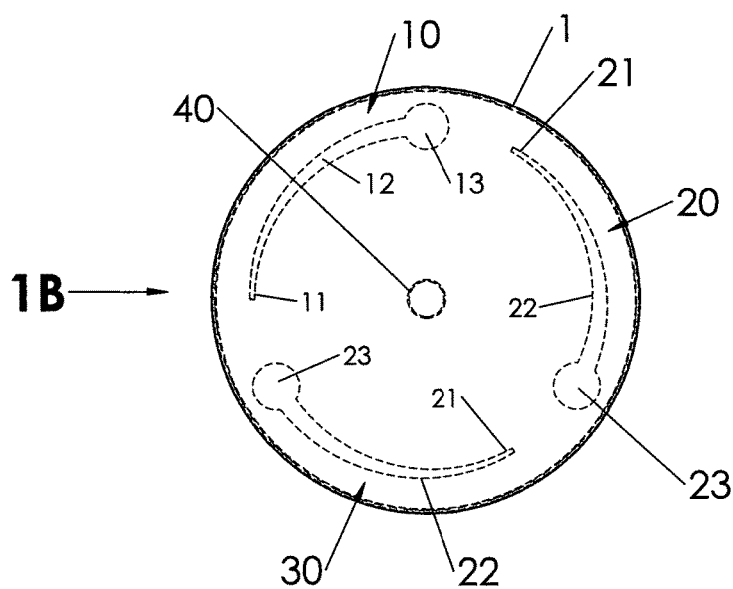
FIG. 1A is a top partial ghost view of a cup/compartment which is the upper portion of the novel combination of a cup/compartment with base/hub used for magnetically holding beverage containers thereon. (this can be the upper or lower portion—the two components locations are interchangeable)

Before explaining the disclosed embodiments of the present invention in detail it is to be understood that the invention is not limited in its applications to the details of the particular arrangements shown since the invention is capable of other embodiments.

The present invention can be applied to any twist-to-lock retention application. Including, but not limited to, for example, light bulbs, door hardware, furniture locks, all-terrain vehicles or with any vehicle features, cabinet hardware, extension cords, electronic equipment (GPS, cell phone(s), appliances, etc.).

Also, the terminology used herein is for the purpose of description and not of limitation. In the Summary above and in the Detailed Description of Preferred Embodiments and in the accompanying drawings, reference is made to particular features (including method steps) of the invention. It is to be understood that the disclosure of the invention in this specification does not include all possible combinations of such particular features. For example, where a particular feature is disclosed in the context of a particular aspect or embodiment of the invention, that feature can also be used, to the extent possible, in combination with and/or in the context of other particular aspects and embodiments of the invention, and in the invention generally.

In this section, some embodiments of the invention will be described more fully with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will convey the scope of the invention to those skilled in the art. Like numbers refer to like elements throughout, and prime notation is used to indicate similar elements in alternative embodiments.

A list of components will now be described.
1 cup/compartment with disc shaped housing
10 first curve plate
11 narrow tip end
12 curve plate main body
13 enlarged head end
20 second curve plate
21 narrow tip end
22 curve plate main body
23 enlarged head end
30 third curve plate
31 narrow tip end
32 curve plate main body
33 enlarged head end
40 upper center alignment magnet
100 base/hub
110 first perimeter magnet in base/hub
115 vertical channel for allowing first perimeter magnet to slide up and down therein
120 second perimeter magnet in base/hub
125 vertical channel for allowing second perimeter magnet to slide up and down therein
130 third perimeter magnet in base/hub
135 vertical channel for allowing third perimeter magnet to slide up and down therein
140 lower center alignment magnet
150 center console in vehicle
155 top surface of center console
200 full cup/insulation sleeve
210 first curve plate
211 narrow tip end
212 curve plate main body
213 enlarged head end
220 second curve plate
221 narrow tip end
222 curve plate main body
223 enlarged head end
230 third curve plate
231 narrow tip end
232 curve plate main body
233 enlarged head end
240 upper center alignment magnet
300 hub/sleeve embodiment with one moveable magnet
310 hub/sleeve
320 central channel
322 top of channel
328 bottom of channel
330 moveable magnet
340 upper metal plate
350 fixed repelling magnet
380 metal surface
400 hub/sleeve embodiment with plural moveable magnets
410 hub/sleeve
420 first channel
422 top of first channel
428 bottom of first channel
430 first moveable magnet
440 first metal plate
450 fixed repelling magnet
460 second channel
462 top of second channel
468 bottom of second channel
470 second moveable magnet
480 second metal plate
490 metal surface The invention can use different numbers and sizes of magnets with varying strength. For example, the sizes of the magnets can each include but are not limited to being approximately ½" by approximately ¼", and the like. The size and strength of the magnets can vary as per the application desired.

Figure 1B:
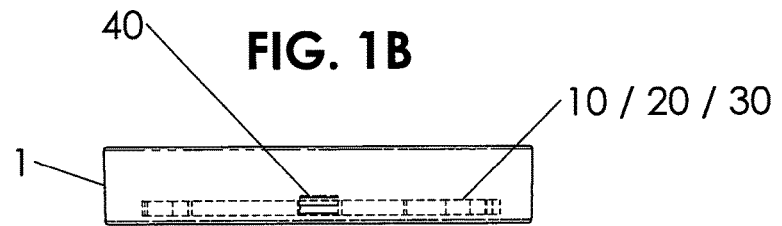
FIG. 1B is a side view of the cup/compartment of FIG. 1A along arrow 1B.

FIG. 1A is a top partial ghost view of a cup/compartment 1 which can be the upper portion of the novel combination of a cup/compartment 1 with base/hub 100 to be later described, which can be used for magnetically holding beverage containers and the like, thereon. FIG. 1B is a side view of the cup/compartment 1 of FIG. 1A along arrow 1B.

Referring to FIGS. 1A-1B, the upper cup/compartment 1 that forms a housing that can have a cylindrical disc shaped configuration and can include a plurality of metal curved plates, such as three curved metal plates 10, 20 and 30, fixed inside and equally spaced about a perimeter thereof, and the material forming the disc shaped housing can be a plastic type material, and the like.

Each of the metal curved plates 10, 20, 30 can have a narrow tip end 11, 21, 31 with a widening main body 12, 22, 32, and an enlarged cylindrical shaped end 13, 23, 33. The curved plates 10, 20, 30 have a squid shape with an enlarged head end and tail end, and can be another shape having one end that increases in width between one end and an opposite end.

A small disc shaped magnet 40 can be fixed and located in the middle of the disc housing 1.

Figure 2A:
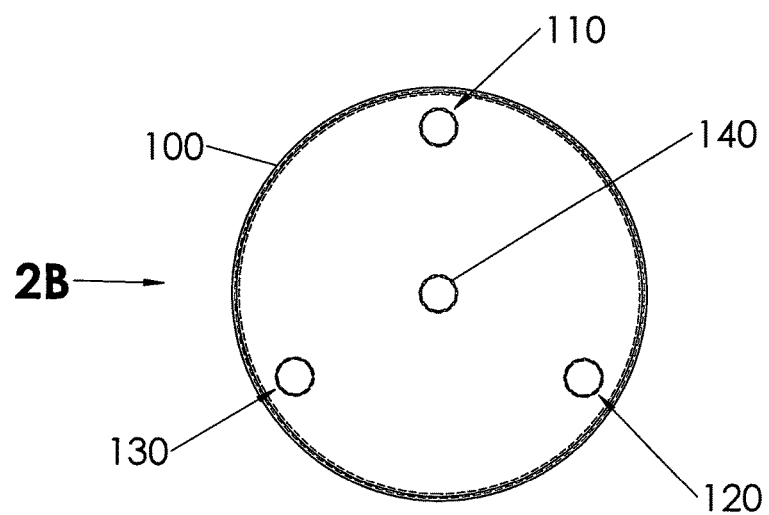
FIG. 2A is a top view of the base/hub which is the lower support portion of the novel combination of a cup/compartment with base/hub used for magnetically holding beverage containers thereon.
Figure 2B:
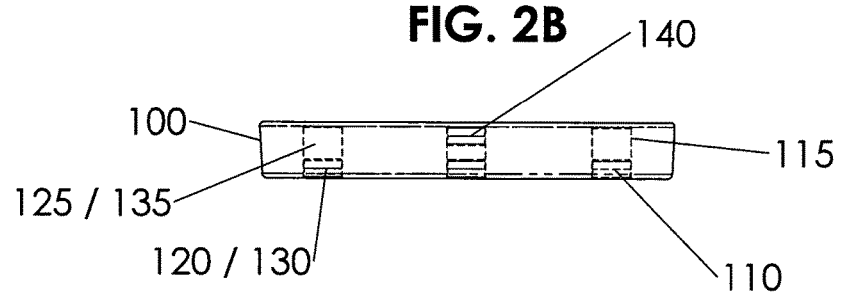
FIG. 2B is a side view the base/hub of FIG. 2A along arrow 1B.

FIG. 2A is a top view of the base/hub 100 which can be the lower support portion of the novel combination of a cup/compartment 1 with base/hub 100 used for magnetically holding beverage containers thereon. The base/hub 100 can also have a cylindrical disc shaped configuration formed from the same material as the upper cup/compartment 1. FIG. 2B is a side view the base/hub 100 of FIG. 2A along arrow 1B. The base/hub 100 can include a plurality moveable small disc magnets, such as three magnets 110, 120 and 130 that can slide up and down in respective vertical channels 115, 125, 135. Each of the vertical channels 115, 125, 135 can have a diameter slightly larger than the diameter of each of the three perimeter magnets 110, 120, 130, and each of the channels 115, 125, 135 can have a height greater than the width (thickness) of each of the magnets 110, 120, 130. For example, the height of the cavity space in each of the vertical channels, 115, 125, 135 can be approximately twice the width (thickness) of each of the magnets 110, 120, 130.

A small disc shaped central alignment magnet 140 can be fixed and located in the middle of the disc shaped housing 100.

The upper central alignment magnet 40 can have a bottom surface which has an opposite polarity to an upper surface of the lower central alignment magnet 140 so that they attract one another.

The slidable and vertically moveable lower perimeter magnets 110, 120, 130 can be magnetically attracted to the curved plates 10, 20, 30. The upper surface of the lower perimeter magnets 110, 120, 130 can have a polarity that is opposite the polarity of the lower facing surface of the upper central alignment magnet 40. The invention can use magnet designs that function with either polarity of the center magnet. One uses attraction and the other repulsion. The "hovering" behavior of the outer magnets differ a bit but the attachment and resulting engagement are similar). The enlarged head ends 13, 23, 22 of the curved metal plates 10, 20, 30 can have each have a diameter similar to the diameter of the lower fixed circular disc magnets 110, 120, 130.

FIG. 3A is a top partial ghost view of the cup/compartment 1 of FIGS. 1A-1B placed on top of the base/hub 100 of FIGS. 2A-2B with the perimeter magnets 110, 120, 130 in the base/hub 100 disengaged from the curved metal plates 10, 20, 30 in the upper cup/compartment. FIG. 3B is a side view of FIG. 3A along arrow 1B. FIG. 3C is a cross-sectional view of the cup/compartment 1 on top of the base/hub 100 of FIG. 3A along arrows 3C.

FIG. 4 is a perspective view of the cup/compartment 1 placed on the top of the base/hub 100 of FIGS. 3A-3C in a disengaged position with the cup/compartment 1 about to be rotated in either direction of arrow R.

FIG. 5A is a top partial ghost view of the cup/compartment 1 placed on top of the base/hub 100 of FIGS. 3A-3C, 4 with the cup/compartment 1 rotated to an engaged position. FIG. 5B is a side view of the cup/compartment 100 of FIG. 5A along arrow 5B. FIG. 5C is a cross-sectional view of the cup/compartment 100 of FIG. 5A along arrows 5C.

Referring to FIGS. 1A-5C, the upper compartment/cup 1 can be either initially fixed on the bottom of a beverage container, such as but not limited to insulated double walled stainless steel tumbler, insulated cup, and the like. Additionally, the upper compartment/cup 1 can be separately adhered to the bottom of a beverage container, by various fastening techniques, such as but not limited to peel and stick tape, hook and loop fasteners, mushroom headed interlocking fasteners, and the like.

The lower hub/base 100 can be initially built into a support surface so that the top of the hub/base 100 is flush with the adjacent support surface.

Figure 6:
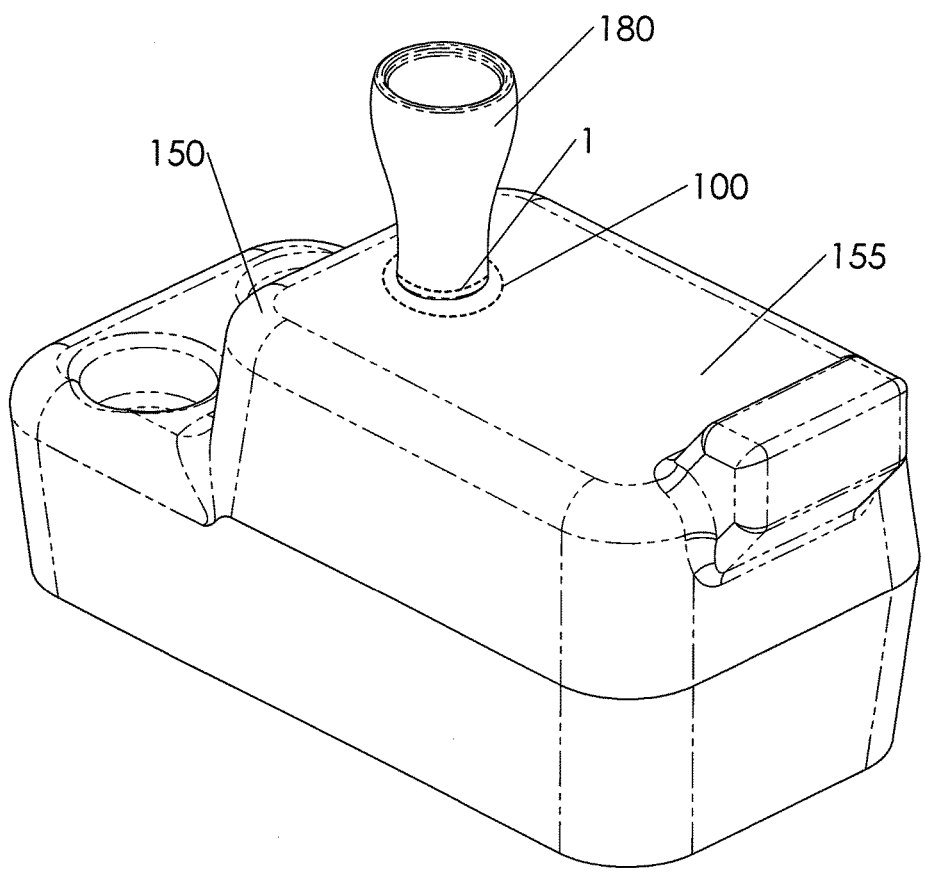
FIG. 6 is a perspective view of the cup/compartment with base/hub in use in a vehicle.

FIG. 6 is a perspective view of the cup/compartment 1 with base/hub 100 in use in a vehicle with the hub/base 100 factory installed into a support surface, such as but not limited to an upper generally horizontal surface 155 of a central console 150. Other surfaces in a vehicle can be used, such as but not limited to armrests, dashboard surfaces, and the like.

Before the invention is used, the upper compartment/cup 1 is physically separated from the base/hub 100 so that there is no magnetic attraction between these parts. At this point, the perimeter disc shaped magnets 110, 120, 130 are physically located at the bottom of the base based on the central magnet in the base that repulses the perimeter magnets and forces them to the bottom of the base/it is a magnetic "spring"). Depending on orientation and configuration the center magnet can also attract to pick the outer perimeter magnets up in the bottom of each of the vertical channels 115, 125, 135.

Next, the user can move the beverage container with the upper compartment/cup 1 over the hub/base 100, and the upper compartment/cup 1 can initially be oriented so that the upper alignment magnet 40 is attracted to the lower alignment magnet 140, while the narrow ends 11, 21, 31 of the curved metal plates 10, 20, 30 are initially placed over the disc shaped perimeter magnets 110, 120, 130 in the hub/base 100.

Next, the user, can rotate the upper compartment/cup 1 counter-clockwise so that the widening portions 12, 22, 32 of the curved metal plates 10, 20 pass over the lower magnets 10, 20, 30 and are magnetically attracted to the lower perimeter magnets 110, 120, 130 until the lower perimeter magnets 110, 120, 130 overcome the opposing forces with the underside of the upper alignment magnet 40, and snap up in each of the vertical channels 115, 125, 135. The quick upward snapping of the magnets sliding upward in the each of the vertical channels 115, 125, 135 to when they hit the top of each of the closed channels 115, 125, 135 causes a sharp snap sound, which indicates to the user that the upper compartment/cup 1 is now locked to the base/hub 100.

Rotating the upper compartment/cup 1 in a reverse direction, such as clockwise can allow the upper compartment/cup 1 to be physically separated from the base/hub 100.

Figure 7A:
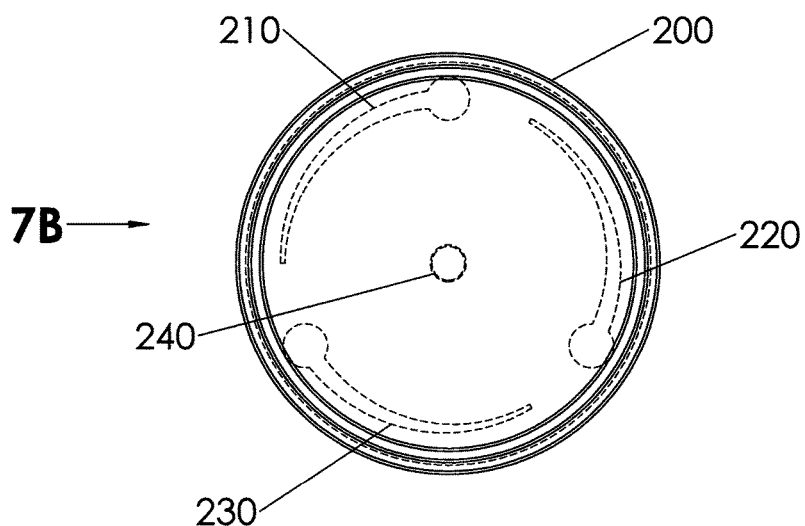
FIG. 7A is a top view of another embodiment with the novel cup/compartment built into the bottom of a cup in an insulation sleeve for a beverage container.
Figure 7B:
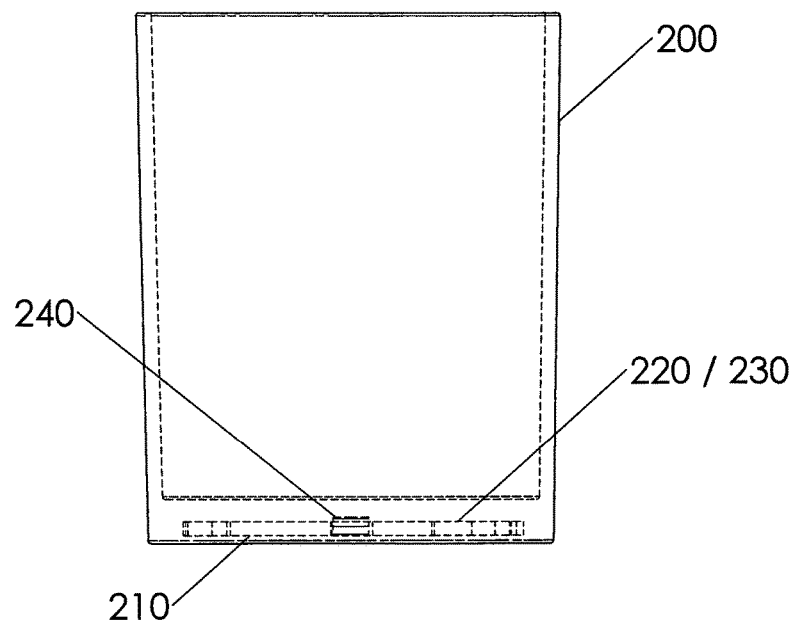
FIG. 7B is a side view cup/compartment of FIG. 7A along arrow 7B.

FIG. 7A is a top view of another embodiment with the novel cup/compartment 200 built into the bottom of a cup in an insulation sleeve for a beverage container. FIG. 7B is a side view cup/compartment of FIG. 7A along arrow 7B. This alternative cup/compartment 200 can also include a plurality of metal curved plates 210, 220, 230 and central alignment magnet 240 that are similar to and function similar to the upper compartment/cup 1 previously described.

The novel base/hub 100, 200 can be generally rigid, and can consist of a flexible material, capable of installation on flat surfaces and/or bent over rounded surfaces.

Although FIG. 6 shows an application to a vehicle, the invention can be used with all types of vehicles, such as but not limited to automobiles, boats, (all-terrain vehicles (ATV's), snowmobiles, recreational vehicles (RV's), personal watercraft, lawn tractors, golf carts, kayaks, appliances, farm equipment, motorcycles. Additionally, the invention ca be used in other applications, such as being built into or retrofitted for use with furniture (such as but limited to tables), coolers, stadium seating, and the like, or surface mounted, retrofit kits.

Although the drawings show the metal plates in the hub, and the moveable magnets in the base, the invention can work with the metal plate in the base and the moveable magnets in the hub.

The invention can work by only using a hub part, without a separate part having a metal plate. The hub can have a moveable magnet where the hub is attached to any surface having metal, such as but not limited to a metal lawnmower frame, metal table, metal chair, and the like. By attaching the hub with moveable magnet to a metal surface, the moveable magnet itself would not be accelerating onto that metal surface. The user can "rock" the hub to remove it from the metal surface, such as tilting the hub relative to the metal surface.

Figure 8A:
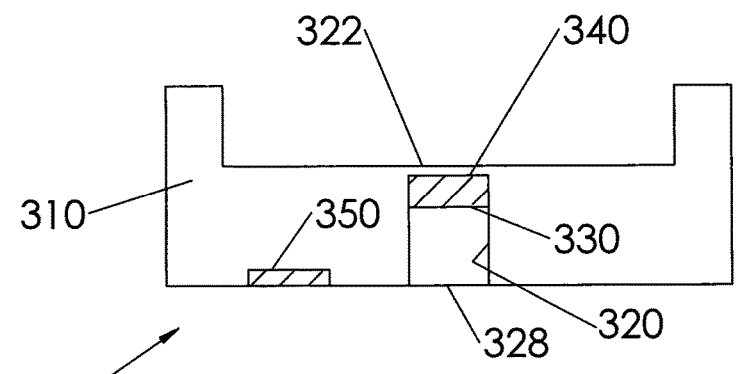
FIG. 8A is a side cross-sectional view of another embodiment of a hub with a single moveable magnet with the magnet in an up position in a channel.
Figure 8B:
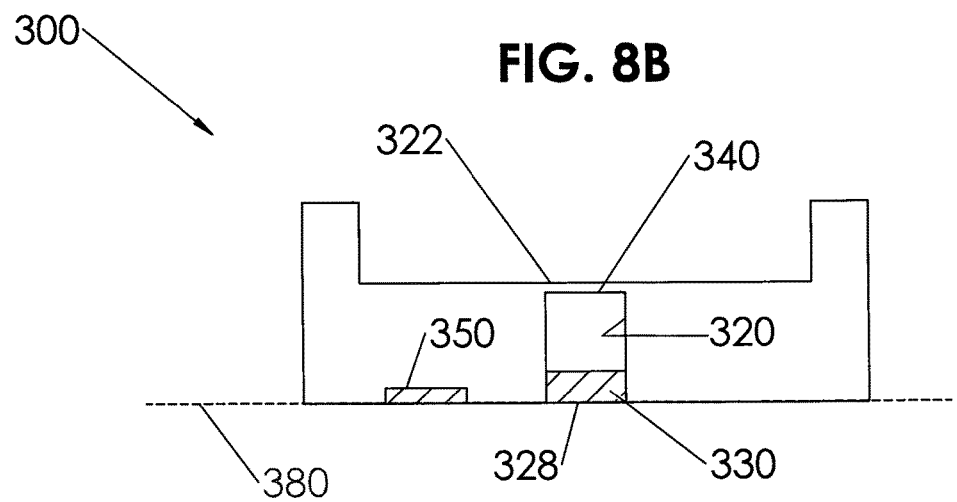
FIG. 8B is another view of the embodiment of FIG. 8A with the moveable magnet moved to the bottom of the channel when the hub is placed on a surface having metal.

FIG. 8A is a side cross-sectional view of another embodiment 300 of a hub 310 with a single moveable magnet 330 with the magnet 330 in an up position in a channel 320. FIG. 8B is another view of the embodiment 300 of FIG. 8A with the moveable magnet 330 moved to the bottom 328 of the channel 320 when the hub 310 is placed on a surface 380 having metal.

The moveable magnet 330 can initially be located in the top 322 of the channel 320 by either the moveable magnet 330 being attracted to a fixed metal plate 340 in the top of the channel, or alternatively, by the moveable magnet 330 being repelled by the fixed magnet 350 in the bottom of the hub 310. As such, in this embodiment, either the fixed metal plate 340 or the fixed bottom magnet 350 are separately used.

Referring to FIGS. 8A-8B, hub 310 can be a beverage container such as an insulation sleeve that can fit about bottles or cans, or be part of the bottom of an existing beverage container as previously described. A single channel 320 can be located in the base of the hub 310 having a moveable magnet 330. Initially, the moveable magnet can be attracted to the top 322 of the channel 320 by a metal plate 340 that is fixed to the top 322 of the channel 320.

When the hub 310 is placed on a metal surface 380, the moveable magnet can be attracted to the bottom 328 of the channel 320 by the larger area metal surface 380 underneath the hub 310. Lifting the hub 310 away from the metal surface 380, then causes the smaller metal plate 340 to attract the moveable magnet 330 to move back to the top 322 of the channel by being magnetically attracted to the fixed metal plate 340.

The moveable magnet 330 can also be initially located in the top 322 of the channel 320 by being repelled from a like polarity fixed magnet 350 that is located in the bottom of the hub 310.

When the hub 310 is placed on a metal surface 380, the moveable magnet 330 can be attracted to the bottom 328 of the channel 320 by the larger area metal surface 380 underneath the hub 310 which overcomes the initial repelling action of the small fixed magnet 350. Lifting the hub 310 away from the metal surface 380, then causes the fixed magnet 350 to repel the moveable magnet 330 back to the top 322 of the channel.

Figure 9A:
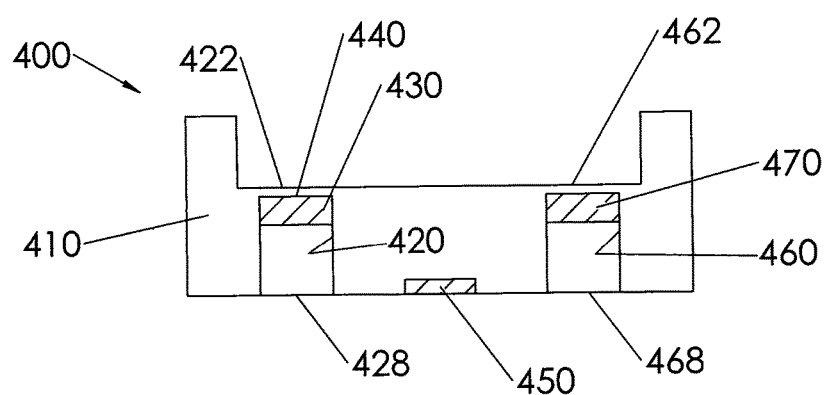
FIG. 9A is a side cross-sectional view of still another embodiment of a hub with a plurality of moveable magnets with the magnets in an up position in their respective channels.
Figure 9B:
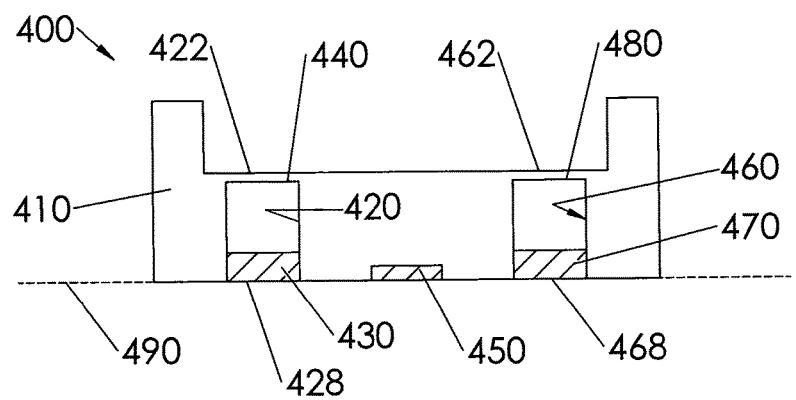
FIG. 9B is another view of the embodiment of FIG. 9A with the moveable magnets moved to the bottom of their channels when the hub is placed on a surface having metal.

FIG. 9A is a side cross-sectional view of still another embodiment 400 of a hub 410 with a plurality of moveable magnets 430, 470 with the magnets 430, 470 in an up position in their respective channels 420, 460. FIG. 9B is another view of the embodiment 400 of FIG. 9A with the moveable magnets 430, 470 moved to the bottom 428, 468 of their channels 420, 460, when the hub 410 is placed on a surface 490 having metal.

The channels 420, 460 can be placed about the perimeter of the base of the hub 410 and spaced apart from one another. While two channels 420, 460 are shown, three or more channels, each with moveable magnets can be used.

Referring to FIGS. 9A-9BB, hub 410 can be a beverage container such as an insulation sleeve that can fit about bottles or cans, or be part of the bottom of an existing beverage container as previously described. A plurality of channels 420, 460 can be located in the base of the hub 410 having respective moveable magnets 430, 470. Initially, the moveable magnets can be attracted to the tops 422, 462 of the channel 420, 460 by metal plates 440, 480 that are fixed to the tops 422, 462 of the channels 420, 460.

When the hub 410 is placed on a metal surface 480, the moveable magnets 430, 470 can be attracted to the bottoms 428, 468 of the respective channels 420, 460 by the larger area metal surface 480 underneath the hub 410. Lifting the hub 410 away from the metal surface 480, then causes the smaller fixed metal plates 440, 480 to attract the moveable magnets 430, 470 to move back to the tops 422, 462 of the respective channels 420, 460 by being magnetically attracted to the fixed metal plates 440, 480.

The moveable magnets 430, 470 can also be initially located in the tops 422, 462 of the respective channels 420, 460 by being repelled from a like polarity fixed magnet 450 located in the bottom of the hub 410.

When the hub 410 is placed on a metal surface 480, the moveable magnets 430, 470 can be attracted to the bottoms 429, 468 of the channels 420, 460 by the larger area metal surface 480 underneath the hub 410 which overcomes the initial repelling action of the small fixed magnet 450. Lifting the hub 410 away from the metal surface 480, then causes the fixed magnet 450 to repel the moveable magnets 430, 470 back to the tops 422, 462 of the respective channels 420, 460.

If the support surface is not metal, a metal plate or metal coaster can be pre-attached to the surface, by any type of fastening system, such as but limited to peel and stick tape, hook and loop fasteners, and the like.

The novel invention automatically engages a proximity change allowing the use of a magnet that would otherwise be far too strong to easily attach and detach an object as needed.

The automatic engagement (movement) of magnets resolves all of the flaws inherent with traditional magnetic attachment:
1) No longer need to compromise between attachment strength and burden of removal—you now have strong AND easy to remove, essentially ON and OFF magnetism.
2) Greatly reduces acceleration/jolt of attachment and detachment
3) Creates audible and tactile "click"
4) Requires no power source to increase and decrease attachment 5) Requires zero moving parts (aside from magnets)
6) Infinitely variable attachment strengths depending on magnet count, size, composition and configuration.

The invention can work with any ferromagnetic metal in the cup. The prototype you have in your office has steel washers in the cup.

While an embodiment uses "squid shaped" plates, the plates can have other geometric shapes and any other shape that can provide similar effects that allows for the use of automatically engaging (moving) magnets.

The novel invention can be used with other configurations of magnets move up or down which drastically increases the attachment, creates tactile and audible click, prevents acceleration when setting cup/object down and allows for easy removal.

While the outer shape of the base and compartment in the figures shows circular shapes, the outer shape of the base and the compartment can include any other geometric shape and the like.

Although the figures show the invention using a beverage holder supported on a generally horizontal surface, the invention can be used with a holder that supports objects that are not beverages. For example, the objects associated with the container can include but are not limited to portable handheld phones, GPS (global positioning) devices, light sources, such as but not limited to light bulbs, and the like.

Additionally, the invention is not restricted to the horizontal support surfaces, and can be used on slanted or angled support surfaces as well as against a vertical support surface, and the like.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A magnetic holder for holding an object therein, comprising:
    a base having an upper surface and a lower surface, at least one magnet moveable within a chamber having a bottom end and a top end, and an adjacent fixed magnet in the base, wherein the fixed magnet and the at least one moveable magnet have polarities that cause the at least one moveable magnet to be moveably repulsed to the bottom end of the chamber away from the fixed magnet; and
    a compartment underneath the object, the compartment having at least one metal plate, the metal plate having material formed from at least one of varying width and varying thickness, so that when the component is oriented over the base and rotated a magnetic attraction increases between the component and the base as a narrow first end of the metal plate is twisted to a larger second end of the metal plate, and the at least one moveable magnet moves to the top end of the chamber causing a sound effect which indicates when the component with the object becomes attached to the base.

2. The magnetic holder of claim 1, wherein the metal plate includes:
    a first end being thinner in thickness than the second end.

3. The magnetic holder of claim 1, wherein the metal plate includes:
    a curved metal plate with a first end being narrower in width than a second end.

4. The magnetic holder of claim 3, the second end of the curved metal plate has an enlarged round configuration.

5. The magnetic holder of claim 1, wherein the at least one moveable magnet in the base includes a plurality of spaced apart moveable magnets along a perimeter edge of the base spaced apart from one another about the fixed magnet, each of the plurality of the spaced apart moveable magnets being located in chambers that each have a top end and a bottom end, and the upper component includes a plurality of metal plates about a perimeter edge of the upper component spaced apart from one another.

6. The magnetic holder of claim 5, wherein the plurality of the spaced magnets in the base are disc shaped magnets.

7. The magnetic holder of claim 1, wherein the upper compartment includes:
    a fixed alignment magnet which is attractable to the fixed magnet in the base, for allowing the upper compartment to be aligned with the base.

8. The magnetic holder of claim 1, wherein the at least one moveable magnet in the base is a disc shaped magnet.

9. The magnetic holder of claim 1, wherein the base has an outer shape imbedded in a support surface with the base flush with the support surface, and the compartment has a generally matching outer shape.

10. The magnetic holder of claim 1, wherein the base includes a separate coaster shape for being attached onto the support surface, and the compartment has a generally matching circular shape.

11. The magnetic holder of claim 1, wherein the component is built into a bottom of a beverage container.

12. The magnetic holder of claim 1, wherein the component has a cup shape for fitting underneath a bottom of a beverage container.

13. The magnetic holder of claim 1, wherein the component has a sleeve shape for fitting about a beverage container.

14. A magnetic holder for holding an object on a surface having metal, comprising in combination:
    a hub having a vertical channel therein with a top and a bottom;
    a moveable magnet inside of the channel being moveable between the top and the bottom of the channel;
    a component for causing the moveable magnet to initially rest against the top of the channel, the component includes a fixed metal portion in the top of the channel to initially cause the moveable magnet to rest against the top of the channel, wherein placing the hub on the surface having the metal causes an attraction force overcoming the initial rest position of the moveable magnet to move from the top of the channel to the bottom of the channel which attaches the hub to the surface having the metal.

15. The magnetic holder of claim 14, wherein the hub adjacent to a beverage container.

16. A method of holding an object with a magnetic holder to a surface having metal, comprising the steps of:
    providing a hub having a vertical channel therein with a top and a bottom;
    providing a moveable magnet inside of the channel being moveable between the top and the bottom of the channel;
    causing the moveable magnet to initially rest against the top of the channel with a component, wherein the component includes a fixed metal portion in the top of the channel; and
    placing the hub on the surface having the metal which causes an attraction force overcoming the initial rest position of the moveable magnet to move from the top of the channel to the bottom of the channel which attaches the hub to the surface having the metal.

* * * * *